(No Model.) 3 Sheets—Sheet 1.
W. H. CHAPMAN & B. C. DONAHUE.
ELECTRICAL INDICATOR.
No. 355,382. Patented Jan. 4, 1887.
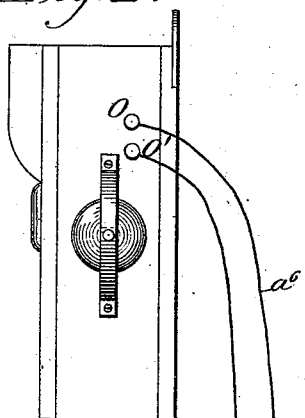
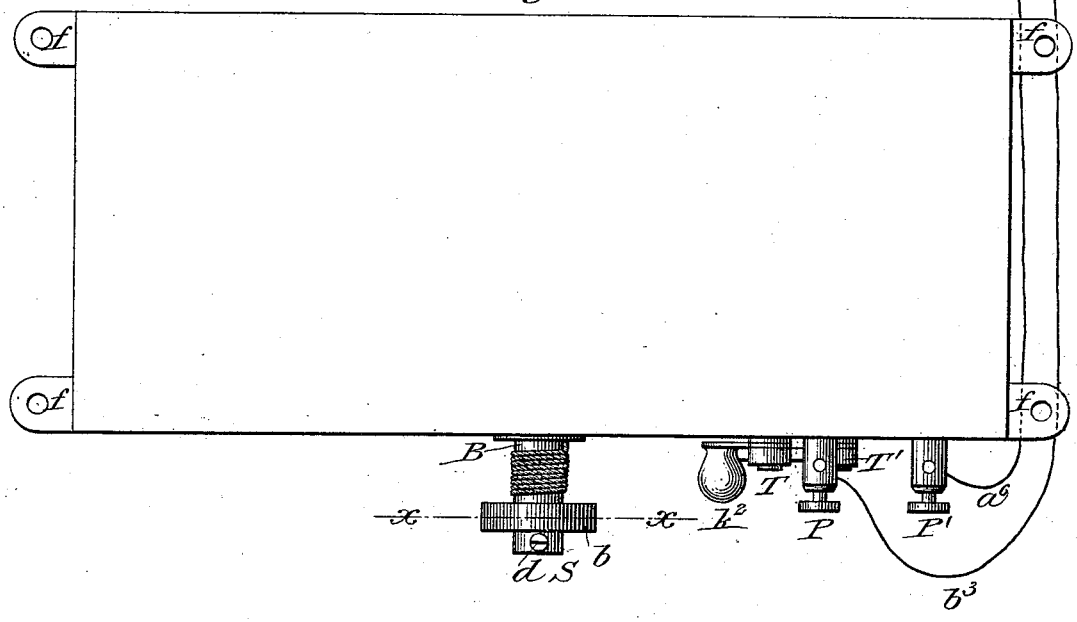
Witnesses:
Geo. N. Fernald
A. H. Davis
Inventors.
William H. Chapman
B. C. Donahue
by Geo. E. Bird, atty (No Model.) 3 Sheets—Sheet 2.
W. H. CHAPMAN & B. C. DONAHUE.
ELECTRICAL INDICATOR.
No. 355,382. Patented Jan. 4, 1887.
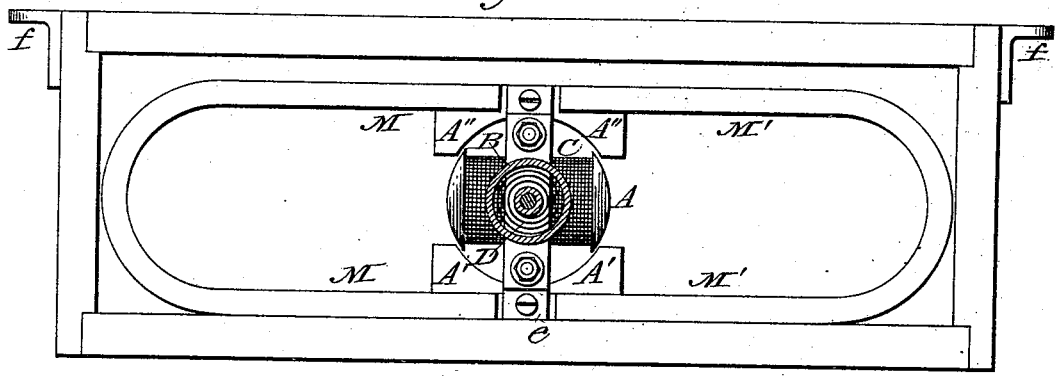
Fig. 7.
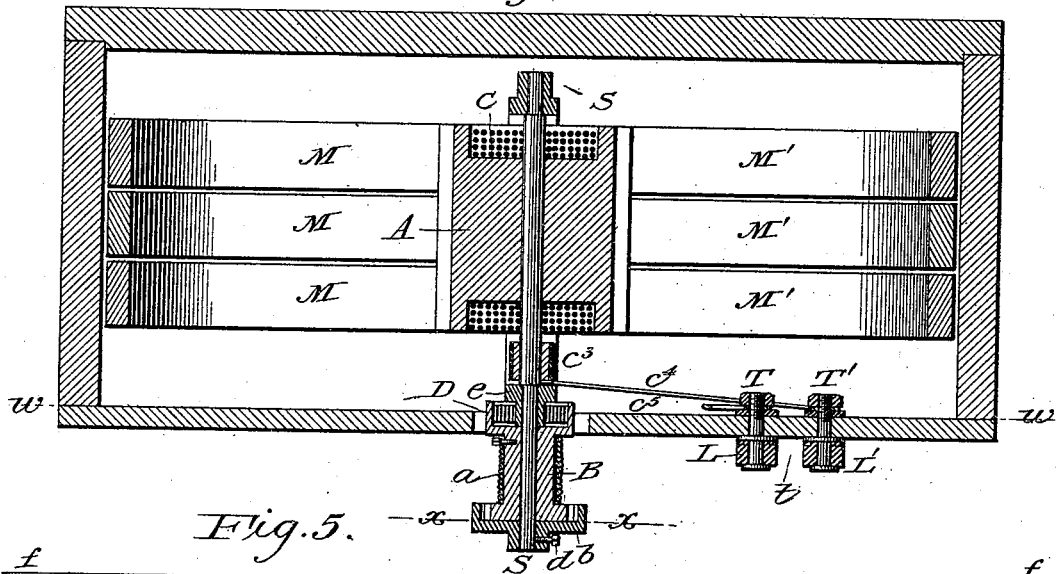
Fig. 6.
Fig. 5.
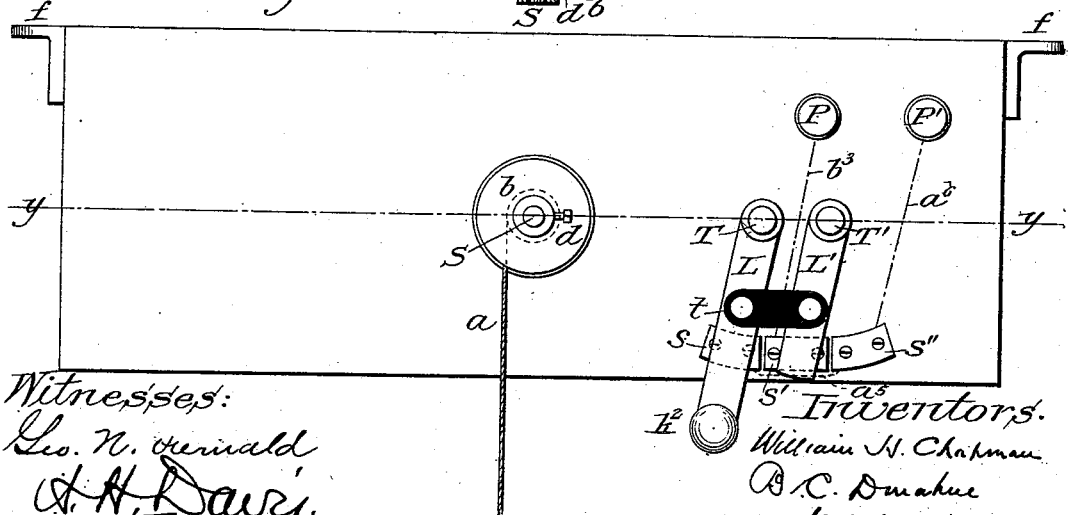
Witnesses:
Geo. N. Fernald
A. H. Davis
Inventors:
William H. Chapman
B. C. Donahue
by their Att'y (No Model.) 3 Sheets—Sheet 3.
W. H. CHAPMAN & B. C. DONAHUE.
ELECTRICAL INDICATOR.
No. 355,382. Patented Jan. 4, 1887.
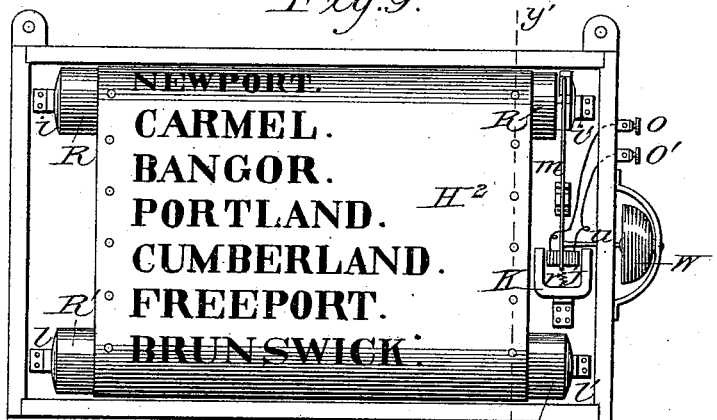
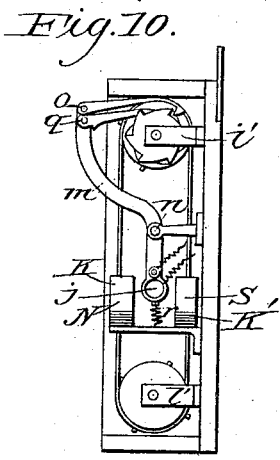
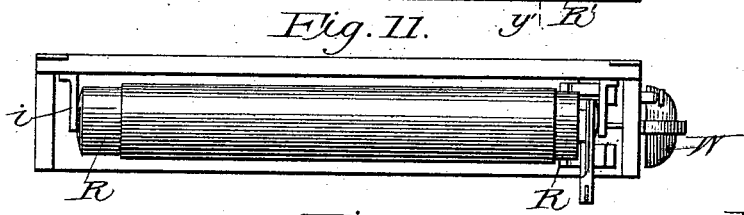
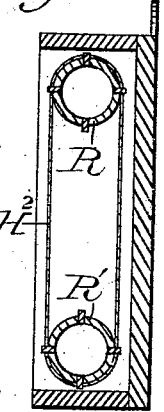
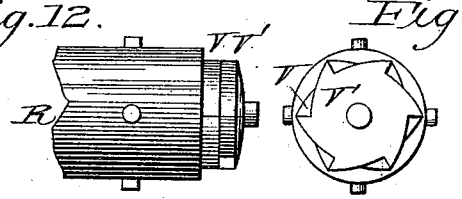
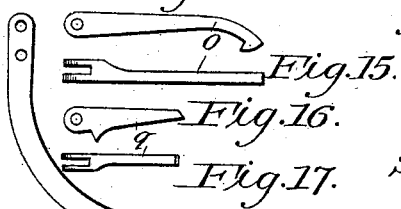
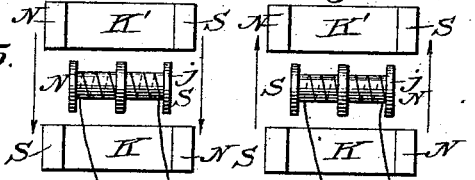
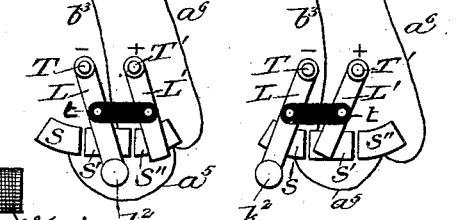
Witnesses:
Geo. N. Fernald
A. H. Davis.
Inventors.
William H. Chapman
B. C. Donahue
by Geo. S. Bird, Atty

UNITED STATES PATENT OFFICE.

WILLIAM H. CHAPMAN AND BERNARD C. DONAHUE, OF PORTLAND, MAINE.

ELECTRICAL INDICATOR.

SPECIFICATION forming part of Letters Patent No. 355,382, dated January 4, 1887.

Application filed April 8, 1886. Serial No. 198,296. (No model.)

*To all whom it may concern:*

Be it known that we, WILLIAM H. CHAPMAN and BERNARD C. DONAHUE, of Portland, in the county of Cumberland and State of Maine, have invented certain new and useful Improvements in Electrical Indicators; and we do hereby declare that the following is a full, clear, and exact description of the invention, that will enable others skilled in the art to which it appertains to make and use the same, reference being had to the accompanying drawings, forming a part of this specification, in which—

Figure 1 is a front elevation of the indicator-box. Fig. 2 is an end view of the same. Fig. 3 is a top plan of the generator-box; Fig. 4, a vertical cross-section on the line $x$ $x$ of Figs. 3 and 6; Fig. 5, a side elevation of the generator-box. Fig. 6 is a cross-section of the same and of the generator within on the line $y$ $y$ of Fig. 5, showing the shaft S in elevation; Fig. 7, a side elevation of the generator-box with the side removed and a section made on the line $w$ $w$ of Fig. 6. Fig. 8 is a vertical section of the indicator-box through the line $y'$ $y'$ of Fig. 9. Fig. 9 is an elevation of the indicator-box with the front removed; Fig. 10, an end view of the same with the side of the box removed; Fig. 11, a top plan of the same with the top and front of the box removed. Fig. 12 is a view of the roller R of Fig. 9; Fig. 13, an end view of same, showing the double ratchet at the end. Fig. 14 is a side view of the pawl $o$; Fig. 15, a top plan of same; Fig. 16, a side view of the pawl $q$; Fig. 17, a top plan of same. Fig. 18 is a side elevation of the lever $m$; Fig. 19, the pin $u$; Fig. 20, the soft-iron armature $j$; Fig. 21, the same with coil of wire. Fig. 22 is a diagram showing the mechanism of the switch, and Fig. 23 is the same with the switch reversed.

The object of our invention is to enable a person at one place to indicate to persons at another place one of a successive series of names through the medium of an electric wire. We accomplish this object by the use of the apparatus shown in the accompanying drawings. This apparatus consists of a generator of electricity, to be operated by hand whenever a signal is to be conveyed, and a receiver or indicator, by which the particular name is indicated.

The current of electricity may be obtained in any convenient manner. The generator is shown in Figs. 5, 6, and 7, and consists of the magnets M M M M' M' M' and an iron armature rigidly attached to the shaft S. A coil of wire, C, surrounds the armature, as is usually the case. The two ends of this wire pass to a commutator, $C^3$, from which a connection is made to the terminals T T' by wires $c^4$ and $c^5$, respectively.

T T' are brass studs on which the two levers L L' are pivoted. (See Fig. 5.) These two levers are connected together and made to move in unison by a yoke or tie, $t$, made of insulating material.

$k^2$ is a small button, by which the levers L L' are moved.

$s$ $s'$ $s''$ are pieces of brass secured to the side of the box. (See Fig. 5.) $s$ and $s''$ are connected together by a wire, $a^5$, (see Figs. 22 and 23,) and to the binding-post P' by the wire $a^6$, while $s'$ is connected to the binding-post P by wire $b^3$. The levers L L' and pieces $s$ $s'$ $s''$ thus constitute a switch.

B in Figs. 6 and 3 is a sleeve placed loosely on the shaft of the generator.

$a$ is a cord wound upon this sleeve and depending therefrom. Near the end of the shaft S the sleeve B has a pawl, $p$, (see Fig. 4,) and $b$ is another sleeve attached tightly to the shaft S' by the set-screw $d$. The sleeve $b$ has a ratchet cut in it, as shown in Fig. 4, with which the pawl $p$ engages.

D (see Figs. 6 and 7) is a coil-spring; one end of which is secured to the fixed bearing $e$ of the shaft and the other end to the sleeve B.

$f$ $f$ are brackets, by means of which the generator-box is held in place.

The indicator consists of a wooden box, on the front of which, H', are printed or painted words showing the purpose for which it is used. In the front of the box is a horizontal opening, $h$. Inside the box is an endless band of paper or other material, on which are delineated the objects to be shown. This band moves over two rollers, R R', which have bearings in the side of the box.

$m$ (see Fig. 10) is a lever pivoted at $n$, and having two pawls, $o$ and $q$, to engage, respectively, with the ratchets V' V. (See Figs. 12 and 13.)

$j$ (see Fig. 10) is a soft-iron armature wrapped with a coil of insulated copper wire, and attached to the lower end of the lever $m$.

K K' are two permanent U-shaped magnets, the polarity of which is indicated by the letters N S.

$r$ is a spring, one end of which is attached to the lever $m$ and the other to the frame of the box at a point in the same vertical plane as the pivot $n$. The two ends of the coil of wire on the armature $j$ are connected to the binding-posts O O'.

W is a bell attached to the side of the indicator-box, which is struck by the pin $u$, projecting from the lever $m$.

One application of our apparatus consists in using it as a railway-station indicator. The generator-box may be placed in the cab of the locomotive, where the cord $a$ will be within convenient reach of the engineer. An indicator-box must be placed in each passenger-car, and preferably one at each end of each car. These indicators are connected together by wires extending along the sides of the car, and the ends of the wires between the cars are connected by couplings, or in some similar manner. Taking, for illustration, the card or list of names shown in Fig. 1, suppose the train at and about leaving Portland, and that at the start the word "Portland" appears through the opening $h$, and the switch in the position shown in Fig. 22. Before reaching the next station, Cumberland, the engineer pulls the cord $a$, which causes the revolution of the sleeve B, and the pawl engaging the ratchet of the sleeve $b$ of the shaft and armature A an electric current is thus generated which actuates the armature, the current passing through the switch and wires to the coil about the armature, and causes it to move toward the magnet K by the influence of repulsion from K' and attraction from K. This turns the cylinder R one notch, the arm $q$ engaging the ratchet V, and the name "Cumberland" appears through the opening $h$. The cord $a$ being released, the action of the spring D winds it again upon the drum B, and it is then in condition for another revolution, which will indicate the next station, and so on as the successive stations are reached. The armature $j$, when the cord is released, is brought back to its normal position by the spring $r$. When the termination of the route is reached, the switch in cab on the generator is turned to the left, as in Fig. 23. The armature in the indicator will then move in the opposite direction—that is, toward the magnet K'—and the names will appear in the reverse order upon the return-trip.

The operation of the switch is further illustrated in Figs. 22 and 23, the two positions which the switch may occupy being shown, and the polarity of the terminals of the generator to which the levers L L' are pivoted is indicated by the signs $+$ and $-$. In the position of the switch shown in Figs. 5 and 23, the $+$ terminal is connected with the binding-post P, and the $-$ terminal with the binding-post P'. When, however, the position of the switch is reversed, as in Fig. 22, P' becomes $+$ and P $-$.

The operation of the armature $j$ is also shown in the same figures. When the switch is in the position shown in Fig. 22, the movement of the armature will be toward the magnet K, and when turned to the left—the position shown in Fig. 23—the armature $j$ will move toward the magnet K'.

The coil-wire which surrounds the armature $j$ may be used without the iron core.

What we claim as our invention is—

1. An electrical indicator having two magnets arranged with their poles in opposition to each other, a soft-iron armature wrapped with a coil of conducting-wire, said armature being connected to actuating mechanism adapted to drive the indicator in either direction, and a series of names on the indicating-band, which may be made to appear in succession direct or reverse, according as a succession of electric currents is sent through said coil in one direction or the other.

2. The combination of an indicator having a series of names printed on a band of paper or other suitable material, a motor consisting of a permanent magnet and an armature, a generator of electricity, and a switch to reverse the direction of the electric current in the coil of wire on said armature.

3. The combination of an indicator having a series of names printed on a band of paper or other suitable material, two permanent magnets, their poles being in opposition to each other, arranged upon either side of and in proximity to a soft-iron armature wrapped with a coil of wire and attached to the lower end of a lever, upon the upper end of which are arms in contact with a ratchet and pawl suitable for moving said band, a generator of electricity, and wires connecting said generator with said indicator.

4. The combination of a generator of electricity with a soft-iron armature which is held in the lower end of a lever, and is surrounded by a coil of wire, said coil of wire being connected by wires with said generator, a switch by which the polarity of the current may be reversed, two magnets on either side of said armature, the poles of said magnets being in opposition, a spring by which the lever may be kept suspended between said magnets, two arms pivoted to the upper end of said lever, and a cylinder having a double ratchet, as described.

5. The combination of an electric generator, a coil of wire connected by wires to the positive and negative poles of the generator, the magnets K K' on either side of the coil of wire, the lever $m$, having the arms $o$ and $q$, the cylinder R, with double ratchet, and cylinder R', with endless apron H², as described.

6. The combination of the cylinders R R', the endless apron with names printed thereon, the cover H', with the opening $h$, equal in size to any one of the names upon said apron, the cylinder with double ratchet V V', arms $o$ and $q$, lever $m$, spring $r$, magnets K K', the armature $j$, surrounded by a coil of wire, the ends of which are connected with the poles of a generator of electricity, together with a switch for changing the character of the current from the generator to the coil of wire, as described.

In testimony that we claim the foregoing we have hereunto set our hands this 3d day of March, 1886.

WILLIAM H. CHAPMAN.
BERNARD C. DONAHUE.

Witnesses:
   AUG. L. SMITH,
   GEORGE E. BIRD.